United States Patent
Rouet et al.

(10) Patent No.: US 7,646,389 B1
(45) Date of Patent: Jan. 12, 2010

(54) DIVERGENT AND NON-DIVERGENT TEXTURE FETCHES

(75) Inventors: Christian Rouet, San Rafael, CA (US); Emmett M. Kilgariff, San Jose, CA (US); Rui M. Bastos, Porto Alegre (BR); Wei-Chao Chen, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 199 days.

(21) Appl. No.: 11/133,010

(22) Filed: May 18, 2005

(51) Int. Cl.
*G09G 5/00* (2006.01)
*G09G 5/36* (2006.01)
*G06T 17/00* (2006.01)
*G06F 13/00* (2006.01)
*G06K 9/40* (2006.01)
*G06K 9/32* (2006.01)

(52) U.S. Cl. .................. 345/587; 345/428; 345/582; 345/606; 345/552; 382/254; 382/274; 382/300; 711/123; 711/125

(58) Field of Classification Search .......... 345/418, 345/428, 581–582, 606, 618, 552, 421, 423, 345/501, 506, 520, 522, 561; 382/254, 274, 382/300, 305, 276, 285, 303–304; 711/113, 711/123, 125–126
See application file for complete search history.

(56) References Cited

U.S. PATENT DOCUMENTS

| 4,586,038 | A | * | 4/1986 | Sims et al. ................. 345/586 |
| 5,801,708 | A |   | 9/1998 | Alcorn et al. |
| 5,805,782 | A |   | 9/1998 | Foran |
| 5,977,977 | A | * | 11/1999 | Kajiya et al. ............... 345/418 |
| 6,433,789 | B1 |  | 8/2002 | Rosman |
| 6,532,013 | B1 |  | 3/2003 | Papakipos et al. |
| 6,816,167 | B1 | * | 11/2004 | Rauchfuss et al. .......... 345/582 |
| 7,098,924 | B2 |  | 8/2006 | Prokopenko et al. |
| 7,126,604 | B1 |  | 10/2006 | Purcell et al. |
| 2003/0169265 | A1 |  | 9/2003 | Emberling |
| 2003/0197707 | A1 | * | 10/2003 | Dawson ...................... 345/543 |
| 2004/0027358 | A1 |  | 2/2004 | Nakao |

* cited by examiner

*Primary Examiner*—Wesner Sajous (57) ABSTRACT

Methods and systems for texture mapping in a computer-implemented graphics pipeline are described. A sample group is identified as including a divergent pixel. A determination is made whether an operand of an instruction executing on the divergent pixel satisfies a condition. A scheme for determining a level of detail for the texture mapping is selected depending on whether or not the condition is satisfied.

21 Claims, 7 Drawing Sheets

610
FETCH DIVERGENCE INFORMATION THAT INCLUDES A BIT THAT HAS BEEN SET TO A FIRST VALUE TO INDICATE THAT A SAMPLE GROUP INCLUDES A DIVERGENT PIXEL

620
DETERMINE WHETHER THE OPERAND OF THE INSTRUCTION EXECUTING ON THE DIVERGENT PIXEL SATISFIES A CONDITION

630
SET THE BIT TO A SECOND VALUE IF THE CONDITION IS SATISFIED

640
DETERMINE LOD USING A SCHEME THAT IS SELECTED ACCORDING TO THE VALUE OF THE BIT

FIG. 6

| 710 | mov r0, r1 |
|     | tex (r0)   |
| 715 | branch     |
| 720 | tex (f[4]) |
| 730 | end of branch |
| 740 | mad        |

FIG. 7

| 810 | mov r0, r1 |
| 815 | branch     |
| 820 | tex (r0)   |
| 830 | end of branch |
| 840 | mad        |

FIG. 8

DIVERGENT AND NON-DIVERGENT TEXTURE FETCHES

FIELD OF THE INVENTION

Embodiments of the present invention generally relate to graphics processing.

BACKGROUND ART

Texture mapping is an important operation in computer graphics. Texture mapping allows a high degree of visual complexity to be applied to rendered scenes but without overly complex modeling. Each point on a textured surface maps to a position in a texture map—each screen coordinate (e.g., x, y) maps to a texture-space coordinate (e.g., s, t). Texture mapping identifies which discrete texture element or elements (e.g., texel) will contribute to each discrete screen element (e.g., pixel).

To further reduce computational complexity, "MIP-mapping" is used with texture mapping. With MIP-mapping, multiple texture maps are pre-produced and stored. Each map corresponds to a particular level of resolution, or level of detail (LOD). Conventionally, successive levels of resolution are scaled by a factor of two. That is, one LOD corresponds to a resolution that is one-half the resolution of the next LOD.

To determine which LOD to use, a texture unit in the graphics pipeline may compute the distance between adjacent pixels in a sample group. For example, a sample group may include four (4) adjacent pixels arranged as a two-by-two array (sometimes referred to as a "quad"). The distances between the pixels in the quad are computed, and an LOD that most closely corresponds to the average distance is selected.

However, there are instances in which all of the pixels in the sample group are not available to determine the LOD. Processing of one or more pixels in the sample group may diverge from the other pixels in the sample group, due to a branch instruction, for example. Thus, an instruction executing on one pixel of the sample group may be different from an instruction executing on another pixel of the sample group. A pixel in a sample group that is in this way out of synch with other pixels in the sample group can be referred to as a "divergent pixel." Conventionally, a sample group (e.g., quad) that includes a divergent pixel is identified by setting a bit (sometimes referred to as the "divergent bit").

SUMMARY OF THE INVENTION

Conventionally, in general, divergence is established by the presence of a branch operation—if there is a branch, then pixels in a sample group are divergent. This relatively inflexible approach prevents LOD from being determined using all pixels in the sample group. Accordingly, a system and/or method that can allow more flexibility when determining LOD would be advantageous. More specifically, such a system and/or method would allow the LOD to be determined using a more exact approach (using all pixels in the sample group) on an increased number of occasions, in particular even if the sample group includes a divergent pixel. Embodiments in accordance with the present invention provide these and other advantages.

In one embodiment of the present invention, a sample group (e.g., a quad) is identified as including a divergent pixel. A determination is made whether an operand of an instruction executing on the divergent pixel satisfies a condition. A scheme for determining the LOD for the texture mapping is selected depending on whether or not the condition is satisfied. In essence, embodiments in accordance with the present invention "turn off" divergence (e.g., unset the divergent bit) in some of the situations where, conventionally, divergence had been "turned on" (e.g., the divergent bit had been set). As such, LOD can be determined using all of the pixels in the sample group, even if the sample group includes (or appears to include) a divergent pixel.

In one particular embodiment, divergence information for a sample group is fetched. The divergence information includes a bit (e.g., the divergent bit) that, in some instances, has been set to a first value to indicate that the sample group includes a divergent pixel. If the aforementioned condition is satisfied, the bit is set (switched) to a second value (that is, the bit is unset). The LOD is determined according to the value of the bit.

In one embodiment, the divergent bit is unset if the operand of the instruction executing on the divergent pixel is a read-only operand or a constant (e.g., an interpolated attribute). In another embodiment, the divergent bit is unset if it can be determined that the operand of the instruction executing on the divergent pixel and the operand of an instruction operating on the other pixels in the sample group are the same. For example, if the operands are sourced from the same register, then the operands will be the same, even if the pixels in the sample group are divergent.

Thus, according to embodiments in accordance with the present invention, in certain instances the LOD can be determined using all of the pixels in the sample group even if the group includes a divergent pixel. In general, if a condition is satisfied, then the behavior of the graphics pipeline is changed. That is, instead of always behaving one way when the divergent bit has been set, the behavior can be switched off when a condition is satisfied. Consequently, the number of occasions where more exact LODs can be determined is increased. Furthermore, embodiments in accordance with the present invention provide consistency with graphics-related specifications such as DirectX 9.0, for instance.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

The drawings referred to in the description should not be understood as being drawn to scale except if specifically noted.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "detecting," "determining," "executing," "selecting," "setting," "specifying" or the like, refer to actions and processes (e.g., flowcharts 400, 500 and 600 of FIGS. 4, 5 and 6, respectively) of a computer system or similar electronic computing device or processor. The computer system or similar electronic computing device manipulates and transforms data represented as physical (electronic) quantities within the computer system memories, registers or other such information storage, transmission or display devices. The present invention is well suited to use with other computer systems.

Figure 1:
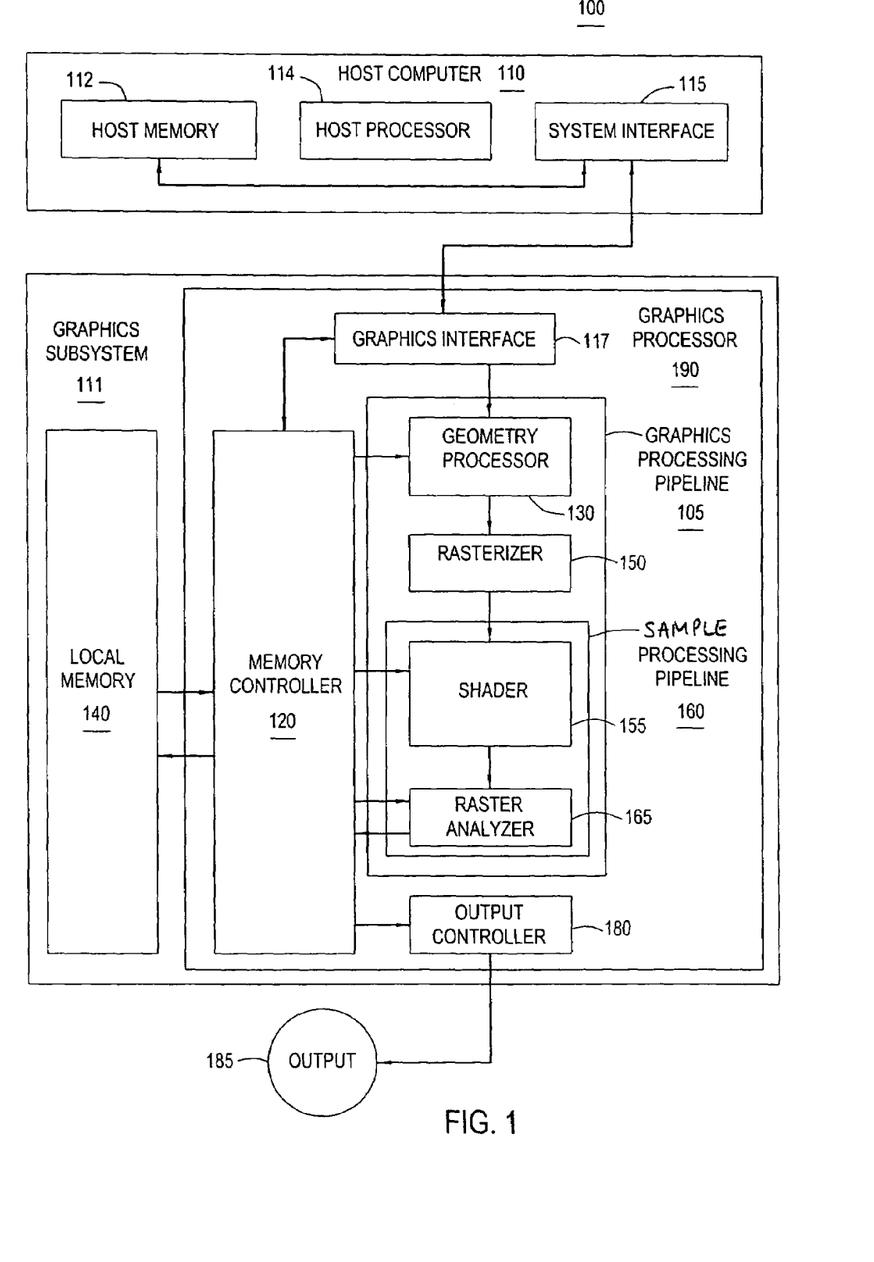
FIG. 1 is a block diagram of an exemplary computer system including a graphics processor upon which embodiments in accordance with the present invention can be implemented.

FIG. 1 is a block diagram illustrating a computer system 100, upon which embodiments in accordance with the present invention can be implemented. As shown, computer system 100 may include, without limitation, a host computer 110 and a graphics subsystem 111. Computer system 100 may be a desktop computer, server, laptop computer, palm-sized computer, tablet computer, game console, cellular telephone, computer-based simulator, or the like.

In the present embodiment, host computer 110 includes a host processor 114, which may include a system memory controller (not shown) to interface directly to a host memory 112 or may communicate with host memory 112 through a system interface 115. System interface 115 may be an I/O (input/output) interface of a bridge device, including the system memory controller, to interface directly to host memory 112.

In the present embodiment, host computer 110 communicates with graphics subsystem 111 (including graphics processor 190) via system interface 115 and a graphics interface 117. Data received at graphics interface 117 can be passed to a geometry processor 130 or written to a local memory 140 through memory controller 120.

For simplicity, the term "sample" is used herein to refer to surfaces, primitives, vertices, pixels or the like. A graphics processing pipeline 105 may include, without limitation, geometry processor 130 and a sample processing pipeline 160, each of which contains one or more programmable graphics processing units that perform a variety of specialized functions. Such functions include, without limitation, table lookup, scalar and vector addition, multiplication, division, coordinate-system mapping, calculation of vector normal, tessellation, and calculation of derivatives, interpolation and the like. Geometry processor 130 and sample processing pipeline 160 are optionally configured such that data processing operations are performed in multiple passes through graphics processing pipeline 105 or in multiple passes through sample processing pipeline 160.

Geometry processor 130 receives a stream of program instructions and vertex data and performs vector floating-point operations or other processing operations. In the present embodiment, processed vertex data is passed from geometry processor 130 to a rasterizer 150. In a typical implementation, rasterizer 150 performs scan conversion and outputs sample, pixel, or sample data, including vertex data, as well as program instructions to sample processing pipeline 160. Alternatively, rasterizer 150 can resample input vertex data and output additional vertices.

Figure 2:
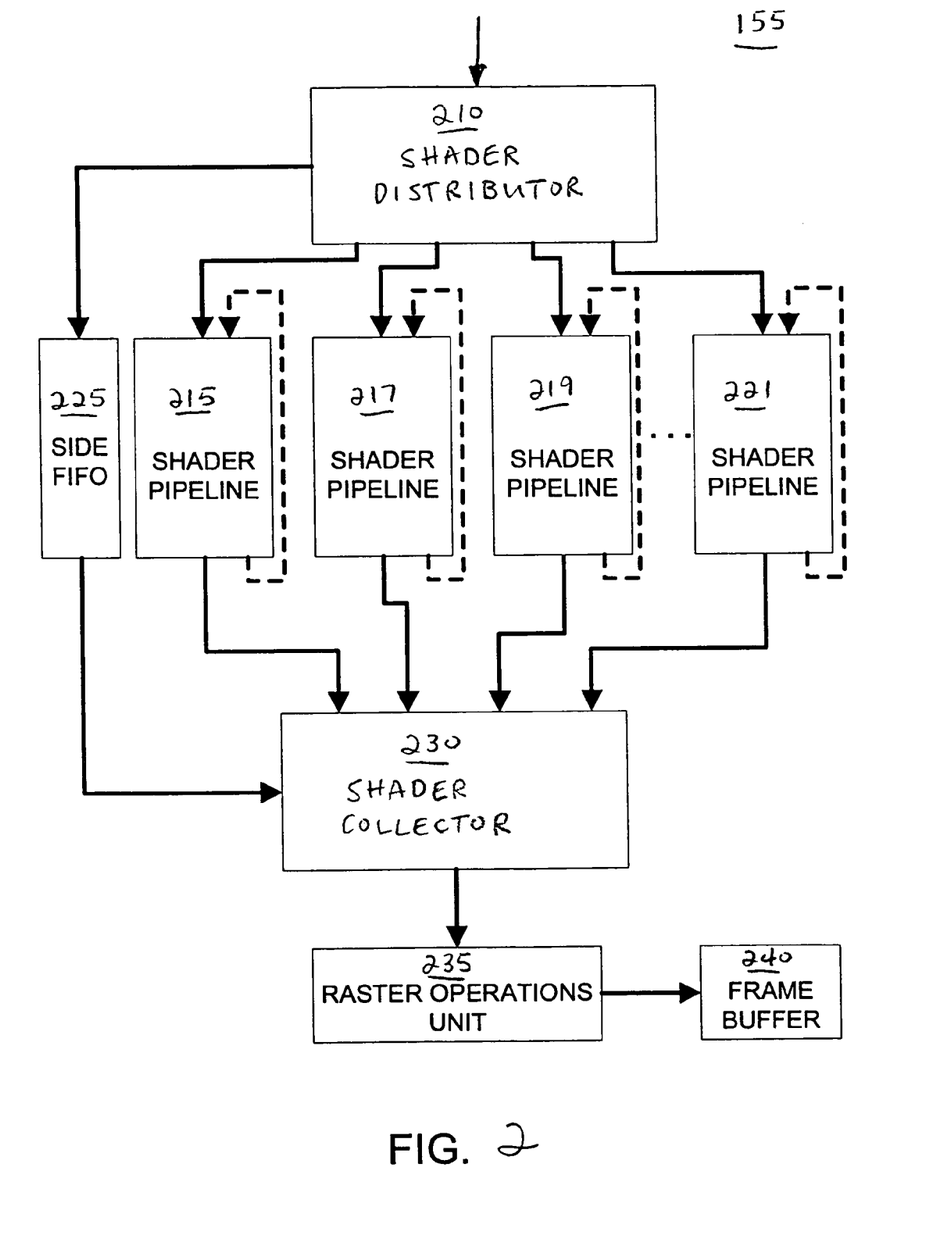
FIG. 2 is a block diagram of an exemplary shader used in a graphics pipeline of a graphics processor upon which embodiments in accordance with the present invention can be implemented.

Just as geometry processor 130 and sample processing pipeline 160 are optionally configured such that data processing operations are performed in a multiple passes, a shader 155, within sample processing pipeline 160, is optionally configured using shader programs such that data processing operations (such as texture mapping) are performed in multiple passes through a recirculating pipeline within shader 155 (e.g., refer to FIG. 2). Shader programs are composed of program instructions compiled for execution within sample processing pipeline 160.

Continuing with reference to FIG. 1, in the present embodiment, data processed by shader 155 is passed to a raster analyzer 165, which performs near and far plane clipping and raster operations, such as stencil, z-test, etc., and saves the results in local memory 140. Raster analyzer 165 can include a read interface and a write interface to memory controller 120, through which raster analyzer 165 accesses data stored in local memory 140.

When processing is complete, in the present embodiment, an output 185 of graphics subsystem 111 is provided using an output controller 180. Output controller 180 is optionally configured to deliver data to a display device, network, electronic control system, other computer system 100, other graphics subsystem 111, or the like.

FIG. 2 illustrates a shader 155 of a graphics processor according to an embodiment of the invention. In this embodiment, the shader 155 includes shader distributor 210, a plurality of shader pipeline units 215, 217, 219, and 221, a side FIFO (first-in first-out) buffer 225, and a shader collector 230. In the example of FIG. 2, there are four shader pipelines. However, alternate embodiments can include only one pipeline or any other number of shader pipelines.

In the present embodiment, the shader distributor 210 receives a stream of samples (e.g., surfaces, primitives, vertices, pixels), and perhaps other information such as the samples' associated rasterizer-generated attributes and per-geometric primitive sample attributes, from the rasterizer 150 (FIG. 1). In one embodiment, the shader distributor 210 receives the stream of samples in the form of a stream of sample groups. In one implementation, a sample group includes a two-pixel-by-two-pixel array, sometimes referred to as a quad. In alternate implementations, sample groups can include any other arrangement of pixels or samples.

The shader distributor 210 of FIG. 2 organizes the received stream of sample groups into one or more segments. A segment is a set of sample groups that can be processed by a shader pipeline at one time.

Each of the shader pipelines 215, 217, 219, and 221 is adapted to execute the instructions of a shader program on each of the samples in a segment. In one embodiment, each shader pipeline includes a number of execution stages that perform perspective correction, texture mapping, blending, and other operations. For a complex shader program, the sample groups of a segment recirculate through the shader pipeline one or more times, with each subsequent pipeline pass executing additional portions of the shader program.

Some of the attributes associated with the groups of samples in a segment do not affect the processing of the segment by the shader pipeline. These are referred to as pass-through attributes. Furthermore, the stream of samples from the rasterizer 205 may also include other commands or data, referred to as state bundles, that need to be communicated with other portions of the graphics pipeline downstream from the sample processing unit, such as the raster operations unit 235. To improve the performance of the plurality of shader pipelines, an embodiment of the shader 155 separates these pass-through attributes from their corresponding segments sent to the shader pipeline and diverts the pass-through attributes and state bundles to a side FIFO 225.

The shader collector 230 retrieves processed sample groups from the shader pipelines, recombines them with their corresponding pass-through attributes from the side FIFO 225, and forwards them to the raster operations unit 235, which may then store the sample groups in frame buffer 240 (e.g., local memory 140 of FIG. 1) if they are not masked off, for example by a depth buffer, stencil buffer, and/or alpha buffer.

Figure 3:
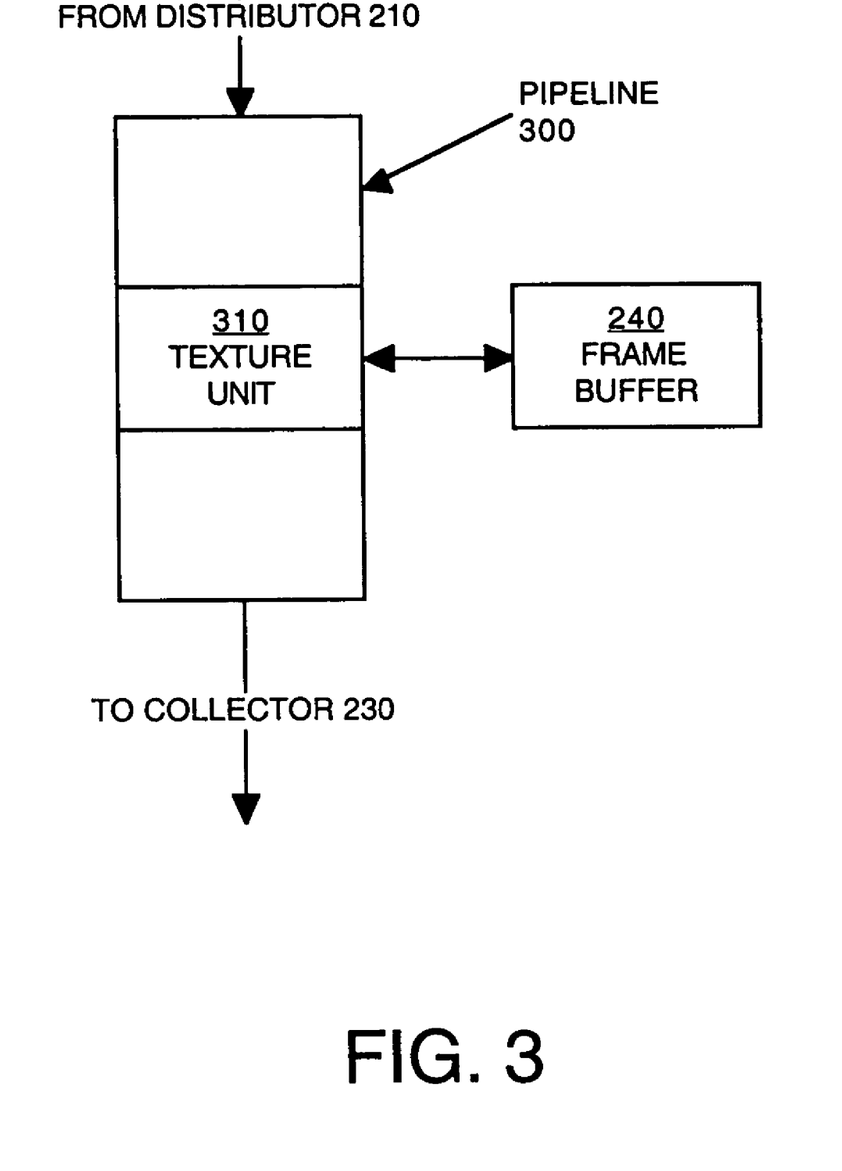
FIG. 3 is a block diagram of an exemplary shader pipeline according to one embodiment of the present invention.

FIG. 3 is a block diagram of an exemplary shader pipeline 300 according to one embodiment of the present invention. Shader pipeline 300 is representative of any of the pipelines 215, 217, 219 or 221 of FIG. 2. In the example of FIG. 3, pipeline 300 includes a texture unit 310 that is, generally speaking, a read port for the pipeline 300. Texture unit 310 fetches a texture (specifically, a texel), and maps the texture to a pixel location in an image. In a MIP-mapping embodiment, texture unit 310 fetches a texel corresponding to an LOD determined by the shader program executed by pipeline 300.

Methods for determining LOD in accordance with various embodiments of the present invention are described in conjunction with FIGS. 4, 5 and 6, below.

Figure 4:
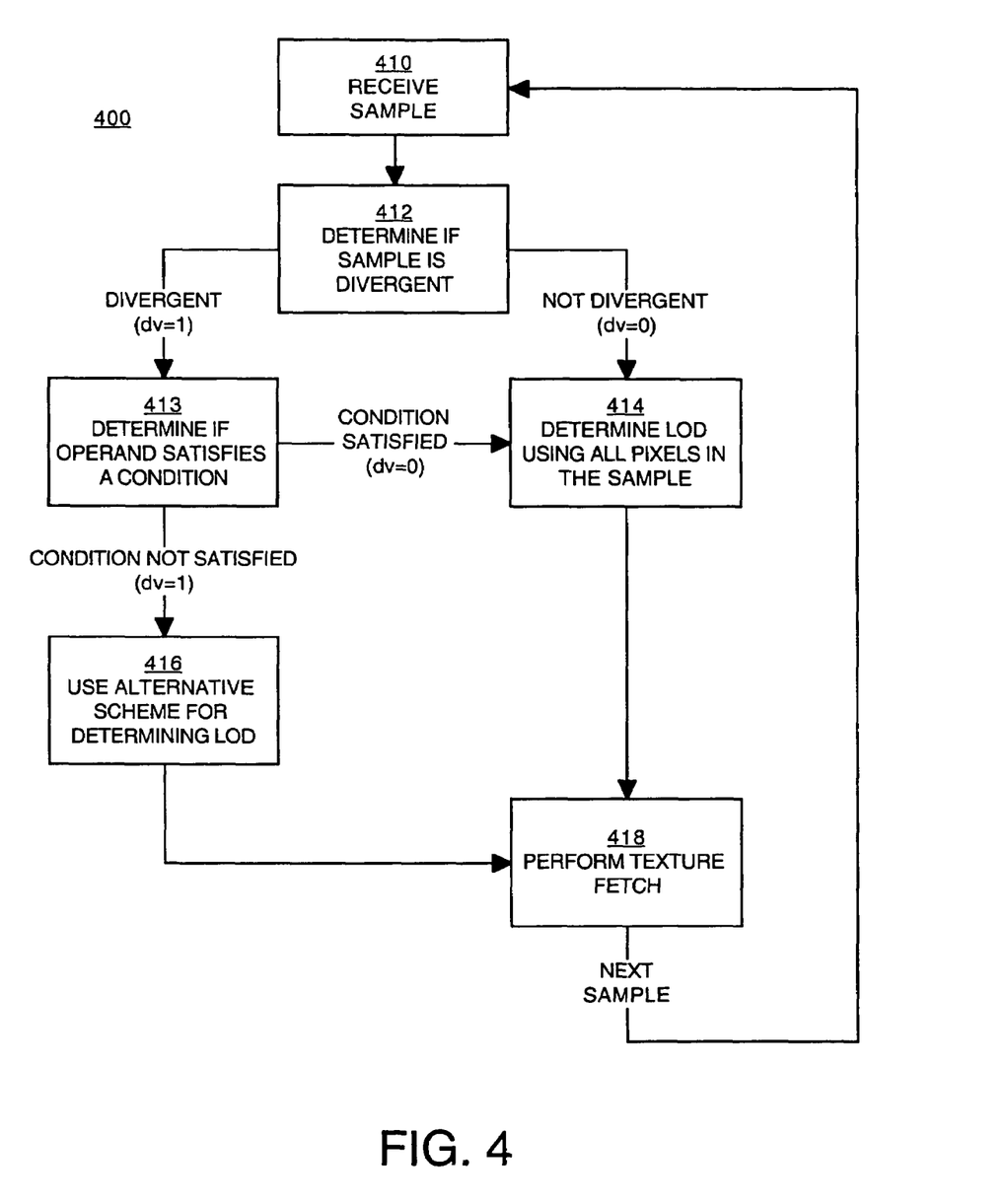
FIG. 4 is an exemplary flowchart of a computer-implemented process used as part of a texture mapping method in accordance with one embodiment of the present invention.

FIG. 4 is a flowchart 400 of a computer-implemented texture mapping method in accordance with one embodiment of the present invention. FIG. 5 is a flowchart 500 of a computer-implemented texture mapping method in accordance with another embodiment of the present invention. FIG. 6 is a flowchart 600 of a computer-implemented method for texture mapping in accordance with yet another embodiment of the present invention. Although specific steps are disclosed in flowcharts 400, 500 and 600, such steps are exemplary. That is, the present invention is well suited to performing various other steps or variations of the steps recited in flowcharts 400, 500 and 600. It is appreciated that the steps in flowcharts 400, 500 and 600 may be performed in an order different than presented and that the steps in flowcharts 400, 500 and 600 are not necessarily performed in the sequence illustrated. In one embodiment, flowcharts 400, 500 and 600 is implemented as program instructions stored in a computer-readable memory unit of computer system 100 and executed by graphics processor 190 (FIG. 1).

With reference first to FIG. 4, in block 410, a sample (e.g., a surface, primitive, vertex, group of pixels) is received into a shader pipeline (e.g., pipeline 300 of FIG. 3). In one embodiment, the sample is a quad (an array of 4 pixels).

In block 412 of FIG. 4, divergence information is fetched for the sample. In one embodiment, if the sample includes a divergent pixel, a bit (e.g., the divergent bit, dv) in the divergence information will have been set (e.g., dv=1). If the sample does not include a divergent pixel, then the divergent bit will not have been set (e.g., dv=0). If the sample is divergent, then flowchart 400 proceeds to block 413; otherwise, flowchart 400 proceeds to block 414.

In block 413, a determination is made whether or not the operand of an instruction (specifically, a texture instruction) being executed on the divergent pixel satisfies a condition (or one of a number of conditions). If a condition is satisfied, then flowchart 400 proceeds to block 414; otherwise, flowchart 400 proceeds to block 416. In one embodiment, if a condition is satisfied, then the value of the divergent bit is unset (e.g., dv=0); otherwise, the divergent bit remains set (e.g., dv=1).

In block 414 of FIG. 4, an LOD is determined using all of the pixels in the sample. Schemes for determining LOD using all of the pixels are known in the art.

In block 416, an alternative scheme is used to determine LOD. There are a number of different options for determining LOD for samples that include a divergent pixel. Such options are known in the art.

In block 418, the texture fetch is performed using the LOD determined from either block 414 or block 416.

Figure 5:
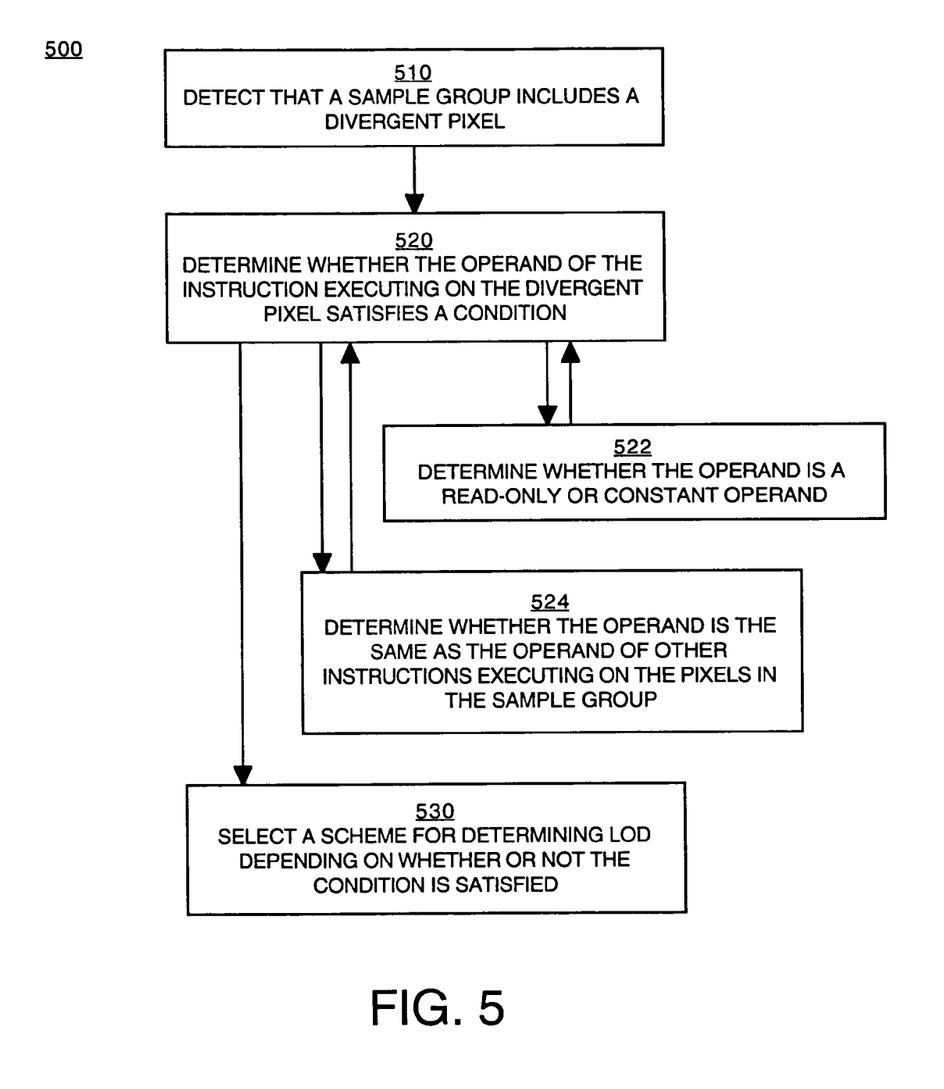
FIG. 5 is an exemplary flowchart of a computer-implemented process used as part of a texture mapping method in accordance with another embodiment of the present invention.

With reference next to FIG. 5, in block 510, a sample group (e.g., a quad) that includes at least one divergent pixel is detected. In one embodiment, the divergent sample is identified by reading the value of a bit (e.g., the divergent bit) associated with the sample.

In block 520, in one embodiment, a determination is made with regard to whether the operand of the instruction that is executing on the divergent pixel satisfies one or more conditions.

Figure 7:
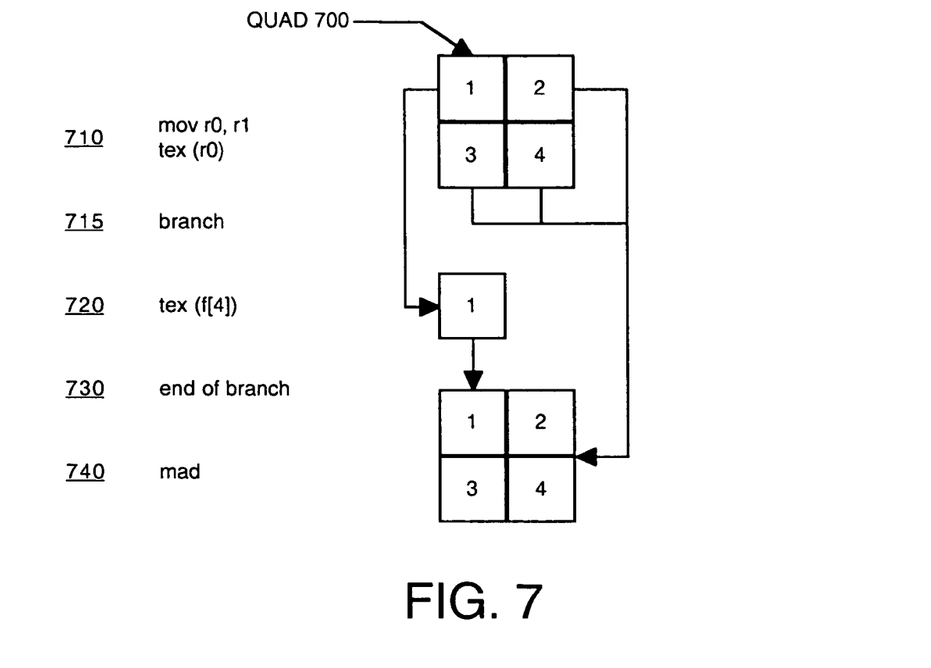
FIGS. 7 and 8 provide examples of program instructions that illustrate conditions where an LOD can be determined using all of the pixels in a sample group including divergent pixels in accordance with embodiments of the present invention.

In one embodiment (block 522), a condition is satisfied if the operand is a read-only operand or a constant operand (e.g., an interpolated attribute). FIG. 7 provides an example of program instructions that illustrate this condition.

Figure 8:
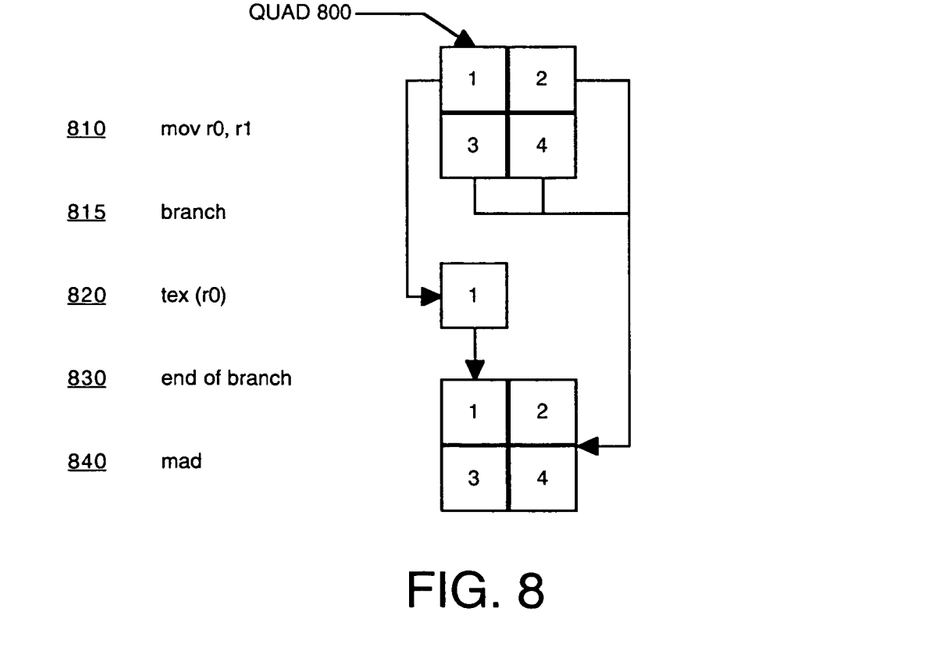

In another embodiment (block 524 of FIG. 5), the condition is satisfied if the operand of the instruction executing on the divergent pixel is the same as the operand of the instruction executing on the other pixels in the sample (the pixels other than the divergent pixel or pixels). In one such embodiment, this can be determined by tracking which register is the source of the values of the instruction operands. FIG. 8 provides an example of program instructions that illustrate this condition.

In block 530 of FIG. 5, a scheme for determining LOD is selected based on whether or not the condition is satisfied. In one embodiment, an LOD is determined using all of the pixels in the sample if the condition is satisfied; otherwise, an alternate scheme is used.

Figure 6:
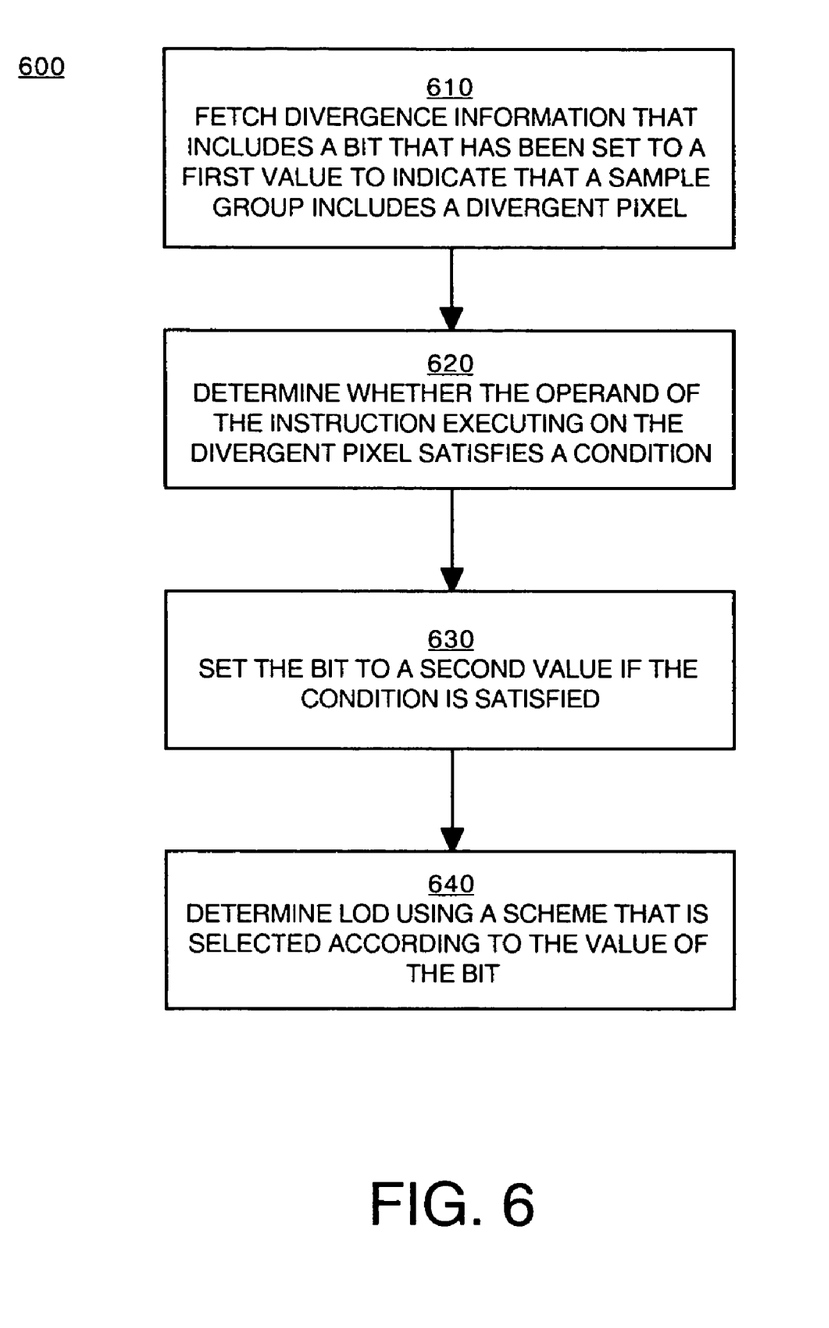
FIG. 6 is an exemplary flowchart of a computer-implemented process used as part of a method for texture mapping in accordance with yet another embodiment of the present invention.

Now with reference to FIG. 6, in block 610, divergence information for a sample group is fetched. In one embodiment, the divergence information includes a bit (e.g., the divergent bit) that has been set to a first value (e.g., a value of 1) to indicate that the sample group (e.g., a quad) associated with the bit includes at least one divergent pixel.

In block 620, a determination is made with regard to whether or not the operand of an instruction executing on the divergent pixel satisfies a condition. As presented above, in one embodiment, the condition is satisfied if the operand is a read-only operand or a constant operand (e.g., an interpolated attribute). In another embodiment, the condition is satisfied if the operand of the instruction executing on the divergent pixel is the same as the operand(s) of the instruction(s) executing on the other pixels in the sample (the pixels other than the divergent pixel or pixels). In yet another embodiment, the condition is satisfied if the operand of the instruction executing on the divergent pixel is sourced from the same register as the operand(s) of the instruction(s) executing on the other pixels in the sample (the pixels other than the divergent pixel or pixels).

In block 630, the bit (e.g., the divergent bit) associated with the sample group is set to a second value (e.g., the bit is unset, or is set to a value of 0) if the condition is satisfied. If the condition is not satisfied, the value of the bit is not changed.

In block 640, in the present embodiment, a scheme for determining LOD is selected according to the value of the bit. That is, in one embodiment, an LOD is determined using all of the pixels in the sample if the bit is set to the second value (e.g., the bit is unset, or is set to a value of 0); otherwise, an alternate scheme is used.

FIGS. 7 and 8 provide examples of program instructions that illustrate conditions where an LOD can be determined using all of the pixels in a sample group, including divergent pixels, in accordance with embodiments of the present invention. The examples of FIGS. 7 and 8 are illustrative only.

In the example of FIG. 7, a sample group (quad 700) is represented as a two-by-two array of pixels 1, 2, 3 and 4. At line 710 of the program instructions, the same instructions are executed on all 4 of the pixels. In the example of FIG. 7, the register r1 is written to register r0, and the value in register r0 is used as the operand for a texture instruction ("tex"). At line 715, a branch condition of some sort is called. Significantly, the branch condition applies only to pixel 1, and thus pixel 1 is divergent from pixels 2, 3 and 4. At line 720, a texture instruction is executed on pixel 1.

Significantly, in the example of FIG. 7, the operand of the texture instruction at line 720 is a read-only value (f[4]); alternatively, the operand may be a constant. Thus, the divergent bit does not have to be set, or can be unset if it has been previously set (e.g., it may be set when the branch condition is detected). Consequently, even though pixel 1 is divergent from pixels 2, 3 and 4, an LOD can be determined using all 4 pixels.

At line 730, the branch condition ends, and at line 740, all 4 pixels are operated on by the same instruction and are thus back in synch.

In the example of FIG. 8, a sample group (quad 800) is represented as a two-by-two array of pixels 1, 2, 3 and 4. At line 810 of the program instructions, the same instruction is executed on all 4 of the pixels. In the example of FIG. 8, the register r1 is written to register r0. At line 815, a branch condition of some sort is called. Significantly, the branch condition applies only to pixel 1, and thus pixel 1 is divergent from pixels 2, 3 and 4.

At line 820, a texture instruction ("tex") is executed on pixel 1. Significantly, in the example of FIG. 8, the operand of the instruction executing on pixel 1 in the branch condition is the same as the operand of any instruction that has executed, or may be executing, on pixels 2, 3 and 4. That is, according to the sequence of instructions in the example of FIG. 8, the operand of the instruction executing on pixel 1 at line 820 is sourced from r0, and the operand of the last instruction applied to pixels 2, 3 and 4 is also sourced from r0. By tracking the source of the operands, thus identifying r0 as the source for each of the operands, it can be determined that the source is the same for each operand and that, consequently, the operands are the same. Thus, the divergent bit does not have to be set, or can be unset if it is set. Therefore, even though pixel 1 is divergent from pixels 2, 3 and 4, an LOD can be determined using all 4 pixels.

At line 830, the branch condition ends, and at line 840, all 4 pixels are operated on by the same instruction and are thus back in synch.

In summary, embodiments of the present invention provide methods and systems for determining an LOD using all of the pixels in a sample group even if the group includes a divergent pixel (e.g., even if the divergent bit has been set for the group). Accordingly, embodiments in accordance with the present invention allow more flexibility in selecting an approach for determining the LOD for texture mapping. Consequently, the LOD can be determined using a more exact approach (using all pixels in the sample group) on an increased number of occasions.

Embodiments of the present invention are thus described. While the present invention has been described in particular embodiments, it should be appreciated that the present invention should not be construed as limited by such embodiments, but rather construed according to the below claims.

What is claimed is:

1. A method of determining a level of detail for texture mapping in a graphics pipeline implemented in a computer, said method comprising:
    accessing data for an array of adjacent pixels comprising a sample group;
    detecting that said sample group includes a divergent pixel, wherein a first instruction executing on said divergent pixel is different from a second instruction executing on each of the other pixels in said sample group;
    in response to said detecting, determining whether an operand of said first instruction satisfies a condition;
    if said condition is satisfied by said operand, using a shader program executed by said graphics pipeline to determine a level of detail for said sample group using a first scheme that utilizes information for all said pixels in said sample group including said divergent pixel; and if said condition is not satisfied by said operand, using said shader program to determine said a level of detail for said sample group using a second scheme that is different from said first scheme and that does not rely on information for all said pixels in said sample group; and
    fetching a texel from a memory of said computer, said texel corresponding to the level of detail determined by said shader program, and mapping said texel to said pixels in said sample group.

2. The method of claim 1 wherein said detecting comprises fetching divergence information for said sample group, wherein said divergence information comprises a bit that has been set to a first value to indicate said sample group includes said divergent pixel; wherein said bit is unset in response to determining said condition is satisfied even though said sample group includes said divergent pixel, and in response to unsetting said bit said first scheme is used to determine said level of detail, wherein said second scheme is used to determine said level of detail if said bit remains set.

3. The method of claim 1 wherein said sample group comprises four pixels.

4. The method of claim 1 wherein said determining whether said operand satisfies said condition comprises determining that said operand is a read-only operand.

5. The method of claim 1 wherein said determining whether said operand satisfies said condition comprises determining that said operand is a constant.

6. The method of claim 1 wherein said determining whether said operand satisfies said condition comprises determining that said first instruction and said second instruction both specify a same operand.

7. The method of claim 1 further comprising determining that said first instruction and said second instruction both specify an operand sourced from a same register.

8. A computer system comprising:
   a processor; and
   a memory unit coupled to said processor, said memory unit containing instructions that when executed implement a computer-implemented method of determining a level of detail for texture mapping in a graphics pipeline, said method comprising:
      accessing data for an array of adjacent pixels comprising a sample group;
      detecting that said sample group includes a divergent pixel, wherein data for said divergent pixel is operated on by a first instruction that is different from a second instruction that operates on data for all other pixels in said sample group;
      if said sample group includes a divergent pixel, determining whether an operand of said first instruction satisfies a condition and otherwise determining a level of detail for said sample group using a scheme that does not rely on information for said divergent pixel; and
      if said condition is satisfied by said operand, selecting a scheme for determining a level of detail for said sample group that utilizes information for all pixels in said sample group.

9. The computer system of claim 8 wherein said detecting comprises accessing divergence information for said sample group, wherein said divergence information comprises a bit that has been set to a first value to indicate said sample group includes said divergent pixel; wherein said bit is unset in response to determining said condition is satisfied even though said sample group includes said divergent pixel, and in response to unsetting said bit said scheme that utilizes information for all pixels in said sample group is used to determine said level of detail, wherein said scheme that does not rely on information for said divergent pixel is used to determine said level of detail if said bit remains set.

10. The computer system of claim 8 wherein said sample group comprises four pixels.

11. The computer system of claim 8 wherein said determining whether said operand satisfies said condition comprises determining that said operand is a read-only operand.

12. The computer system of claim 8 wherein said determining whether said operand satisfies said condition comprises determining that said operand is a constant.

13. The computer system of claim 8 wherein said determining whether said operand satisfies said condition comprises determining that said first instruction and said second instruction both specify a same operand.

14. The computer system of claim 8 further comprising determining that said first instruction and said second instruction both specify an operand sourced from a same register.

15. A computer-readable storage medium having computer-readable program code embodied therein for causing a computer system to perform a method of determining a level of detail for texture mapping comprising:
   accessing data stored in memory of said computer system, said data for an array of adjacent pixels comprising a sample group;
   said computer system executing a shader, said shader detecting that said sample group includes a divergent pixel, wherein a first instruction executing on said divergent pixel is different from a second instruction executing on each of the other pixels in said sample group;
   in response to said detecting, determining whether an operand of said first instruction satisfies a condition; and
   if said condition is satisfied by said operand, then said shader selecting a first scheme for determining a level of detail for said sample group, wherein otherwise said shader selects a second scheme that is different from said first scheme to determine said level of detail for said sample group, wherein further said first scheme utilizes information for all pixels in said sample group and second scheme utilizes information for a subset of said pixels in said sample group.

16. The computer-readable storage medium of claim 15 wherein said detecting comprises reading divergence information for said sample group, wherein said divergence information comprises a bit that has been set to a first value to indicate said sample group includes said divergent pixel; wherein said bit is unset in response to determining said condition is satisfied even though said sample group includes said divergent pixel, and in response to unsetting said bit said first scheme is used to determine said level of detail, wherein said second scheme is used to determine said level of detail if said bit remains set.

17. The computer-readable storage medium of claim 15 wherein said sample group comprises four pixels.

18. The computer-readable storage medium of claim 15 wherein said method further comprises determining that said operand is a read-only operand, wherein if said operand is a read-only operand, then said condition is satisfied.

19. The computer-readable storage medium of claim 15 wherein said wherein said method further comprises determining that said operand is a constant, wherein if said operand is a constant, then said condition is satisfied.

20. The computer-readable storage medium of claim 15 wherein said method further comprises determining that said first instruction and said second instruction each specify a same operand, wherein if said first instruction and said second instruction each specify a same operand, then said condition is satisfied.

21. The computer-readable storage medium of claim 15 wherein said method further comprises determining that said first instruction and said second instruction each specify an operand sourced from a same register, wherein if said first instruction and said second instruction each specify an operand sourced from a same register, then said condition is satisfied.

* * * * *